United States Patent
Wu et al.

(10) Patent No.: US 11,267,276 B2
(45) Date of Patent: Mar. 8, 2022

(54) OPTICALLY VARIABLE GHOST IMAGE WITH EMBEDDED DATA

(71) Applicant: IDEMIA IDENTITY & SECURITY USA LLC, Billerica, MA (US)

(72) Inventors: Yecheng Wu, Lexington, MA (US); Robert L. Jones, Andover, MA (US); Daoshen Bi, Boxborough, MA (US); Ashley S. R. Tiguy, Billerica, MA (US)

(*) Notice: Subject to any disclaimer, the term of this patent is extended or adjusted under 35 U.S.C. 154(b) by 0 days.

(21) Appl. No.: 15/853,260

(22) Filed: Dec. 22, 2017

(65) Prior Publication Data

US 2018/0186164 A1     Jul. 5, 2018

Related U.S. Application Data

(60) Provisional application No. 62/441,137, filed on Dec. 30, 2016.

(51) Int. Cl.
*B42D 25/30*     (2014.01)
*B42D 25/305*    (2014.01)
(Continued)

(52) U.S. Cl.
CPC .......... *B42D 25/23* (2014.10); *B42D 25/30* (2014.10); *B42D 25/305* (2014.10); *B42D 25/309* (2014.10); *B42D 25/328* (2014.10); *B42D 25/351* (2014.10); *B42D 25/378* (2014.10); *B42D 25/435* (2014.10); *B42D 25/455* (2014.10); *B42D 25/46* (2014.10); *B44F 1/10* (2013.01); *G06K 19/06103* (2013.01)

(58) Field of Classification Search
CPC ..... B42D 25/30; B42D 25/305; B42D 25/309

USPC ......................................................... 283/77
See application file for complete search history.

(56) References Cited

U.S. PATENT DOCUMENTS

| 2004/0181671 A1* | 9/2004 | Brundage | B42D 25/00 713/176 |
| 2005/0078851 A1* | 4/2005 | Jones | B42D 25/00 382/100 |

(Continued)

FOREIGN PATENT DOCUMENTS

| FR | 2997784 A1 * | 5/2014 | ............. B42D 25/00 |

OTHER PUBLICATIONS

FR-2997784-A1 English Translation (Year: 2014).*
(Continued)

*Primary Examiner* — Kyle R Grabowski
(74) *Attorney, Agent, or Firm* — Adam Lewental; Robert Facey

(57) ABSTRACT

Techniques are described to embed graphical identifiers into a ghost image within a layer of laminate of an identification document. The ghost image includes optically variable media that has a first appearance when viewed from a front of the identification document in reflected light at a first angle and a second, different appearance when viewed from the front of the identification document in reflected light in a second, different angle. During the ghost image generation process, a graphical identifier can be placed on a baseline ghost image to generate an adjusted ghost image. Once the adjusted ghost image is printed onto the identification document, the graphical identifier can be viewable based on the appearance of the adjusted ghost identifier in relation to the reflected light.

11 Claims, 4 Drawing Sheets

(51) Int. Cl.
*B42D 25/309* (2014.01)
*B42D 25/23* (2014.01)
*B42D 25/328* (2014.01)
*B42D 25/378* (2014.01)
*G06K 19/06* (2006.01)
*B44F 1/10* (2006.01)
*B42D 25/435* (2014.01)
*B42D 25/46* (2014.01)
*B42D 25/351* (2014.01)
*B42D 25/455* (2014.01)

(56) References Cited

U.S. PATENT DOCUMENTS

| | | | |
|---|---|---|---|
| 2005/0161512 A1* | 7/2005 | Jones | B42D 25/00 235/487 |
| 2007/0016790 A1 | 1/2007 | Brundage et al. | |
| 2009/0315318 A1* | 12/2009 | Jones | B42D 25/00 283/85 |
| 2011/0057040 A1 | 3/2011 | Jones et al. | |

OTHER PUBLICATIONS

International Search Report in International Application No. PCT/US17/68076, dated Apr. 6, 2018, 4 pages.
PCT International Preliminary Report on Patentability in International Appln. No. PCT/US2017/068076. date Jul. 11, 2019, 8 pages.

* cited by examiner

OPTICALLY VARIABLE GHOST IMAGE WITH EMBEDDED DATA

CROSS-REFERENCE TO RELATED APPLICATIONS

This application claims the benefit of U.S. Provisional Patent Application No. 62/441,137, filed on Dec. 30, 2016 and titled "OPTICALLY VARIABLE GHOST IMAGE WITH EMBEDDED DATA," which is incorporated herein by reference in its entirety.

FIELD

The present specification generally relates to security features for identification ("ID") documents.

BACKGROUND

Identification ("ID") documents play a critical role in today's society. One example of an Identification document is an ID card. Identification documents are used on a daily basis to prove identity, to verify age, to access a secure area, to evidence driving privileges, to cash a check, and so on. Airplane passengers are required to show an Identification document during check in, security screening, and prior to boarding their flight. In addition, because we live in an ever-evolving cashless society, Identification documents are used to make payments, access an automated teller machine (ATM), debit an account, make a payment, and the like.

Many Identification documents include a core layer which can be pre-printed, such as a light-colored, opaque material. The core is laminated with a transparent material to form a so-called "card blank." Information, such as variable personal information (e.g., photographic information), is printed on the card blank. The information may include an indicium or indicia, such as the invariable information common to a large number of Identification documents (e.g., for example the name and logo of the organization issuing the documents). To protect the information that is printed, an additional layer of transparent overlaminate is typically coupled to the card blank and printed information.

Many Identification documents are made via roll laminating processes. Roll laminating processes introduce stresses by stretching and laminating in a non-uniform manner, resulting in steady state processes that produce thermal stresses that change over time. These Identification documents typically require adhesives, the presence of which may promote tampering that can result in separation of these Identification documents into layers.

SUMMARY

In general, techniques are described to embed graphical identifiers into a ghost image within a layer of laminate of an identification document. The ghost image includes optically variable media that has a first appearance when viewed from a front of the identification document in reflected light at a first angle and a second, different appearance when viewed from the front of the identification document in reflected light in a second, different angle. During the ghost image generation process, a graphical identifier can be placed on a baseline ghost image to generate an adjusted ghost image. Once the adjusted ghost image is printed onto the identification document, the graphical identifier can be viewable based on the appearance of the adjusted ghost identifier in relation to the reflected light.

The graphical identifiers can be alphanumeric characters (e.g., letters or numbers), or identifiable graphical designs (e.g., a logo associated with an issuing authority of the identification), or a combination of both. The graphical identifier may be associated with a piece of personally identifiable information that is stored in a secure identification database associated with the issuing authority that issues the identification document. For example, a particular graphical identifier may be associated with secure customer information (e.g., social security number), whereas another graphical identifiers may be associated with information associated with the issuing authority of the identification document (e.g., an issuance identifier associated with the identification document).

The detection and verification of the graphical identifiers can be used to improve various security features of identification documents. For instance, the graphical identifiers can be used to improve authenticity verification of an identification document. For example, because the graphical identifiers are inserted onto a ghost image (as opposed to the identification document itself), in some instances, a detection of a graphical identifier within a ghost image can be used to verify the authenticity of the identification document. In such examples, because special printing techniques are employed in generating and adjusting the ghost image, forgers may face difficulty in inserting the graphical identifiers into a false ghost image within a counterfeit identification document. In other examples, the combinations of graphical identifiers (e.g., the number and arrangement of multiple graphical identifiers within a ghost image), or visual attributes of one or more graphical identifiers (e.g., font type, font modifiers, text size, etc.) can also be used to verify the authenticity of an identification document.

In other instances, the detection of a graphical identifier, combinations of graphical identifiers, or visual attributes of the graphical identifiers can also be used to identify personally identifiable information that is not displayed on the identification document itself. As an example, a particular graphical identifier may be associated with an individual's social security number such that detection of the graphical attribute by an authorized individual and/or detector device can be used to obtain the individual's social security number, which is not displayed on the identification document itself.

The graphical identifiers embedded within the identification document may or may not be visible to the human eye. In some implementations, the graphical identifiers can be made large enough to enable manual verification using human eyes. In other implementations, the graphical identifiers can be constructed to be small enough such that they appear invisible within the ghost image. In such implementations, the graphical identifiers can be detected using a detector device that uses specific optical scanning techniques to detect the graphical identifiers within the ghost image. In some implementations, a combination of eye-detectable and machine-readable graphical identifiers can be included in order to improve the security features of the identification document.

In one general aspect, an identification document includes a multilayer laminate comprising a first layer and a ghost image. The ghost image includes optically variable media applied to the first layer and having a first appearance when viewed from a front of the identification document in reflected light at a first angle and a second, different appearance when viewed from the front of the identification document in reflected light at a second, different angle. The ghost image also includes one or more graphical identifiers on the first layer that are viewable in one of the reflected light at the first angle or the reflected light at the second first angle. Each of the one or more graphical identifiers are assigned to embedded data of an object identified within the identification document.

One or more implementations can include the following optional features. For example, in some implementations, the ghost image includes a halftone image generated from a color photographic image by: removing a background of the color photographic image, converting the color photographic image with the background removed to a negative greyscale image, and generating the ghost image from the negative greyscale image.

In some implementations, at least one of the one or more graphical identifiers includes a graphical overlay associated with an issuing authority of the identification document.

In some implementations, at least one of the one or more graphical identifiers includes an alphanumeric character.

In some implementations, at least one of the one or more graphical identifiers includes a graphical identifier associated with an issuing authority of the identification document.

In some implementations, the ghost image is a halftone image of a photographic image of an individual associated with the identification document.

In some implementations, the first appearance is that of a positive image of the ghost image, and the second appearance is that of a negative image of the ghost image.

In some implementations, the ghost image is displayed on a surface of the multilayer laminate in response to ultraviolet light being applied to the identification document.

In some implementations, the ghost image is responsive displayed on a surface of the multilayer laminate in response to infrared light being applied to the identification document.

In some implementations, the identification document further includes a temperature-sensitive region that changes in appearance based on a temperature of the identification document. In such implementations, the identification also includes a region of the identification document corresponding to the ghost image overlaps with the temperature-sensitive region such that a change in appearance of the temperature-sensitive component produces a change in appearance of the ghost image.

In another general aspect, a method is performed is performed by one or more computers. The method includes the following operations: obtaining a first image of an object, the first image being associated within an identification document; obtaining data indicating (i) a graphical identifier to be inserted in the first image, and (ii) embedded data for the object that is assigned to the graphical identifier; identifying one or more visual attributes of the graphical identifier; determining, based on the one or more visual attributes of the graphical identifier, (i) a size of a representation of the graphical identifier to be placed in the first image, and (ii) a region of the first image to place the representation of the graphical identifier; generating a second image of the object based on combining the representation of the graphical identifier and the first image according to the size of the representation and the region of the first image to place the representation of the graphical identifier; generating a ghost image of the second image; and providing, for output, an instruction that causes optically variable media to be applied to a location of the identification document that corresponds to a location of the ghost image on the identification document.

One or more implementations can include the following optional features. For example, in some implementations, the one or more visual attributes of the graphical identifier includes an average pixel value of pixels included in the graphical identifier. In such implementations, determining the region of the first image to place the representation of the graphical identifier includes determining that the average pixel value of the pixels included in the graphical identifier satisfies a predetermined darkness threshold. Additionally, the region of the first image includes pixels that collectively have an average pixel value satisfying the predetermined darkness threshold.

In some implementations, the size of the representation of the graphical identifier to be placed in the first image is determined based at least on the average pixel value of the pixels included in the graphical identifier.

In some implementations, the method further includes the following operations: identifying a first portion of the first image that includes the object; and identifying a second portion of the first image that does not include the object. In such implementations, the region of the first image where the representation of the graphical identifier is placed is included within the first portion of the first image.

In some implementations, the method further includes the following operations: identifying a first portion of the first image that includes the object; and identifying a second portion of the first image that does not include the object. In such implementations, the region of the first image where the representation of the graphical identifier is placed is included within the second portion of the first image.

In some implementations, generating the ghost image includes generating a negative image of the second image; and removing the second portion of the first image.

In some implementations, the first image is a color image, and generating the second image includes converting the first image to a greyscale image.

In some implementations, identifying the portion of the first image that correspond to the object and the portion of the first image that does not correspond to the object includes segmenting the first image.

In some implementations, the first image is a portrait of an individual associated with the identification document. In such implementations, the object is a detected face of individual, and the embedded data includes personally identifiable information of the individual.

In some implementations, at least one of the one or more graphical identifiers includes a graphical overlay associated with an issuing authority of the identification document.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
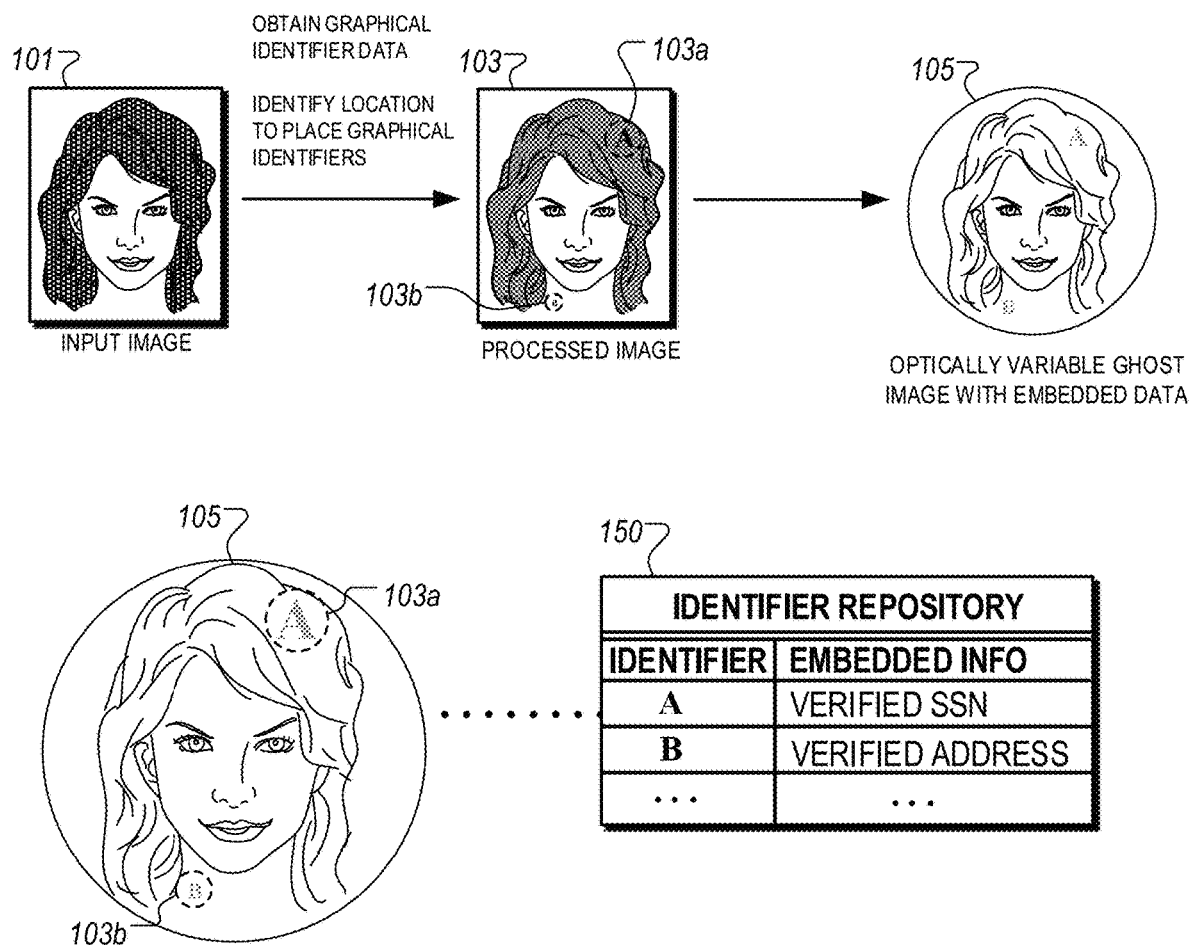
FIG. 1 depicts an example of a process for generating an optically variable ghost image with embedded information.

In general, techniques are described to embed graphical identifiers into a ghost image within a layer of laminate of an identification document. The ghost image includes optically variable media that has a first appearance when viewed from a front of the identification document in reflected light at a first angle and a second, different appearance when viewed from the front of the identification document in reflected light in a second, different angle. During the ghost image generation process, a graphical identifier that is associated with piece of embedded information can be placed on a baseline ghost image to generate an adjusted ghost image. Once the adjusted ghost image is printed onto the identification document, the graphical identifier can be viewable based on the appearance of the adjusted ghost identifier in relation to the reflected light.

As used herein, "identification" at least refers to the use of an identification document to provide identification and/or authentication of a user and/or the i document itself. For example, in a conventional driver license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one instance, include covert images that, when viewed using the proper facilitator (e.g., an appropriate light source for covert images, an appropriate temperature source for thermochromic images, etc.), provide a discernable image that is usable for identification or authentication purposes. In some implementations, "identification" includes digital identifications such as digitally issued driver's licenses, digital identities, and the like. For example, a digital identification that is used to replace a physical identification can be used with the techniques described throughout.

There are a number of reasons why an image or information on an Identification document might not qualify as an "identification quality" image. Images that are not "identification quality" may be too faint, blurry, coarse, small, etc. to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g., hair color or eye color) of an individual.

Certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment, an image or data on an Identification document can be considered to be "identification quality" if it has embedded in it machine-readable information (such as digital watermarks or steganographic information) that also facilitate identification and/or authentication.

Further, in at least some embodiments, "identification" and "authentication" are intended to include (in addition to the conventional meanings of these words), functions such as recognition, information, decoration, and any other purpose for which indicia can be placed upon an article in the article's raw, partially prepared, or final state. Also, in addition to Identification documents, techniques described herein can be employed with product tags, product packaging, business cards, bags, charts, maps, labels, and the like, particularly those items including marking of a laminate or over-laminate structure. "Identification document" thus is broadly defined herein to include these tags, labels, packaging, cards, etc.

"Personalization," "personalized data," and "variable" data are used interchangeably herein, and refer at least to data, characters, symbols, codes, graphics, images, and other information or marking, whether human readable or machine readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments, personal/variable data can include some fixed data, as well.

For example, in at least some embodiments, personalized data refers to any data that is not pre-printed onto an Identification document in advance, so such personalized data can include both data that is cardholder-specific and data that is common to many cardholders. Variable data can, for example, be printed on an information-bearing layer of the ID card using thermal printing ribbons and thermal printheads. Personalized and/or fixed data is also intended to refer to information that is (or can be) cross-linked to other information on the Identification document or to the Identification document's issuer. For example, personalized data may include a lot number, inventory control number, manufacturing production number, serial number, digital signature, etc. Such personalized or fixed data can, for example, indicate the lot or batch of material that was used to make the Identification document, what operator and/or manufacturing station made the Identification document and when, etc.

The terms "indicium" and "indicia" as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultra-violet or other non-visible radiation. Thus, in at least some embodiments, an indicium formed on any layer in an Identification document may be partially or wholly in the form of a marking visible only under non-visible radiation. Markings including, for example, a visible "dummy" image superposed over a non-visible "real" image intended to be machine read may also be used.

"Laminate" and "overlaminate" include (but are not limited to) film and sheet products. Laminates usable with at least some embodiments include those which contain substantially transparent polymers or which have substantially transparent polymers as a part of their structure. Examples of suitable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer, a film layer, or both.

The degree of transparency of the laminate can, for example, be dictated by the information contained within the Identification document, the particular colors and/or security features used, etc. The thickness of the laminate layers is not critical, although in some embodiments it may be preferred that the thickness of a laminate layer be about 1-20 mil (about 25-500 μm). Types and structures of the laminates described herein are provided only by way of example, those skilled in the art will appreciate that many different types of laminates are suitable.

For example, in Identification documents, a laminate can provide a protective covering for the printed substrates and provides a level of protection against unauthorized tampering (e.g., a laminate would have to be removed to alter the printed information and then subsequently replaced after the alteration). The material(s) from which a laminate is made may be transparent, but need not be. Laminates can include synthetic resin-impregnated or coated base materials composed of successive layers of material, bonded together via heat, pressure, or both. As described herein, laminates may be fused polycarbonate structures formed in the absence of adhesives. Laminates also include security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxies.

For purposes of illustration, examples illustrate various aspects using images that are representative of a bearer of an Identification document (e.g., a photographic likeness). However, virtually any indicium can be usable as an "image," which is used herein to include virtually any type of indicium.

FIG. 1 depicts an example of a process for generating an optically variable ghost image 105 with embedded information. In the example illustrated, the optically variable ghost image 105 is generated based on processing a portrait 101 of an individual that is associated with an identification document. In other examples, however, the optically variable ghost image 105 may be generated from other types of input images as described in more detail below.

The portrait 101 is initially processed to generate a processed image 103, which includes graphical identifiers 103a and 103b embedded within the processed image 103. During this process, graphical identifier data may be obtained in order to identify the graphical identifiers to be placed within the processed image 103 as well as the location within the image where the graphical identifier may be placed. In other instances, other configuration information such as the number of graphical identifiers to place within the processed image, the visual attributes associated with each of the embedded graphical identifiers, among other types of information may also be obtained.

The portrait 101 is then modified to include the graphical identifiers 103a and 103b in order to generate the processed image 103. The placement and the visual attributes of the graphical identifiers within the processed image 103 may depend on various factors. In some instances, the size of a graphical identifier may be based on an amount of darkness in nearby pixels (measured based on pixel values) where the graphical identifier is to be placed. As illustrated in the example depicted, the size of the graphical identifier 103a is larger than the size of the graphical identifier 103b because the graphical identifier 103a is placed in a darker region of the image 103 whereas the graphical identifier 103b is placed in a lighter region of the image 103. In such instances, the size adjustment of the graphical identifiers may be used to limit the visibility of the graphical identifiers on the identification document. For example, in applications where the placement of the graphical identifiers is intended to be invisible (or near-invisible) to the naked eye, the size of the graphical identifiers may be adjusted to reduce visibility in lighter regions of the optically variable ghost image 105.

Once the system selects the graphical identifiers to insert into the portrait 101, the locations within the image 103 to insert the graphical identifiers, and the visual attributes of the graphical identifiers (e.g., font type, size, font modifications), the optically variable ghost image 105 is then generated based on the processed image 103. Detailed descriptions related to the generation of an optically variable ghost image from a portrait image (or any other type of image) is provided below in FIGS. 2 and 3.

In particular, in some instances, the graphical identifiers 103a and 103b are inserted into the portrait 101 based on replacing a dot pattern associated with a region of the portrait 101 where a graphical identifier is to be placed with a generated dot pattern of the graphical identifier to be placed into the portrait 101. Once this process is complete, the processed image 103 is generated with graphical identifiers embedded in the specified regions within the portrait 101.

In the example illustrated in FIG. 1, the optically variable ghost image 105 includes a graphical identifier 103a (represented in the figure with the letter "A") and a graphical identifier 103b (represented in the figure with the letter "B"). Each of the graphical identifiers 103a and 103b may be associated with textual information stored within an identifier repository 150. The identifier repository can specify a portion of secured information that corresponds to a particular identifier. In the example illustrated, graphical identifier 103a is associated with a verified SSN of an individual associated with an identification document, and graphical identifier 103b is associated with a verified address of the individual. In this example, detection of the graphical identifiers 103a and 103b within the optically variable ghost image 105 can be used to determine a verified SSN and a verified address of the individual from the identification repository based on indexing stored information by the detected graphical identifier.

In some implementations, the identifier repository 150 may also specify different types of embedded information for different permutations of graphical identifiers. For example, one portion of embedded information may be associated with an italicized version of graphical identifier 103a, whereas another portion of embedded information may be associated with a bolded version of the graphical identifier 103b. Alternatively, in other instances, the identifier repository 150 may also specify different portions of embedded information based on the size associated with the graphical identifier within the optically variable ghost image 105.

Techniques are now described to generate the optically variable ghost image 105. For instance, different image processing techniques may be used to preprocess an original image that is to be printed as a covert and/or optically variable ghost image (using, for example, covert and/or optically variable media) depending on whether the tonality of image reproduction (e.g., printing process) is bitonal (e.g., two tones such as black and white or a first color and second color) or monochromatic (e.g., shaded image, grayscale, etc.). Other optional factors to consider include the viewing methods used with the image, such as reflectance, transmissive characteristics (e.g., UV glowing) and tactility. As used herein, "optically variable device" (OVD) generally refers to an image (e.g., an iridescent image) that exhibits various optical effects such as movement or color changes when viewed.

In some cases, an image may be in digital form, such as resulting from being digitally captured, e.g., via a digital camera, optical sensor, etc., or through scanning a photograph with a scanner, etc. In at least some embodiments, this captured image may be refined to produce an intermediate image, which can be transferred or printed (or used to generate an image to be transferred or printed) to the Identification document as a covert image.

In certain cases, bitonal images (e.g., black and white images), such as those produced through mass-transfer thermal printing and laser xerography, may be implemented. Generally, in this embodiment, a captured image is processed to bring out or otherwise enhance relevant features found in the captured image. Relevant features of a human face may include the face outline, nose and mouth pattern, ear outline, eye shape, eye location, hairline and shape, etc., or any other feature(s) that have been deemed to be relevant for identification purposes (e.g., particular features used with matching algorithms such as facial recognition algorithms). Once identified, these featured can be "thickened" or otherwise emphasized. The emphasized features can then form a digital version of a covert image, which can be transferred to an identification card.

Dye diffusion thermal transfer printing ("D2T2") and thermal transfer (also referred to as mass transfer printing) are two printing techniques used to print information on identification cards. For example, D2T2 has been used to print images and pictures, and thermal transfer has been used to print text, bar codes, and single color graphics.

Dye diffusion is a thermal imaging technology that allows for the production of photographic quality images. In dye diffusion printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an Identification document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Typically, printing with successive color panels across the document creates an image in or on the document's surface. Dye diffusion can result in a very high printing quality, especially because the energy applied to the thermal printhead can vary to vary the dye density in the image pixels formed on the receiver, to produce a continuous tone image. Dye diffusion can have an increased cost as compared to other methods, however, because of the special dyes needed and the cost of dye diffusion ribbons. Also, the quality of dye diffusion printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black, referred to by the symbol "K") is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using dye diffusion. However, mass transfer printing can sometimes be faster than dye diffusion, and faster printing can be desirable in some situations.

Printing of black ("K") can be accomplished using either dye diffusion or mass transfer. For example, black monochrome "K" mass transfer ribbons include Kr (which designates a thermal transfer ribbon) and Kd (which designates dye diffusion). The black that is created by dye diffusion is referred to as "process black"—i.e., a combination of cyan, yellow and magenta to create black. The K panel is a carbon black entity and is a real "black." Process black will allow IR to pass through, while K will not. The term "D2T2" is a combination of the phrases "Dye Diffusion" (D2) and "Thermal Transfer" (T2); T2 is a mass transfer ribbon panel and performs in a similar fashion as any other mass transfer technology. Both dye diffusion and thermal ink have been combined in a single ribbon (e.g., D2T2 ribbon), which is the well-known YMCK (Yellow-Magenta-Cyan-Black) ribbon. Another panel containing a protectant ("P") or laminate (typically a clear panel) also can be added to the YMCK ribbon.

Commercial systems for issuing Identification documents are of two main types, namely so-called "central" issue (CI), and so-called "on-the-spot" or "over-the-counter" (OTC) issue.

CI type Identification documents are not immediately provided to the bearer, but are later issued to the bearer from a central location. For example, in one type of CI environment, a bearer reports to a document station where data is collected, the data are forwarded to a central location where the Identification document is produced, and the Identification document is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a driver license card through the mail.

In contrast, a CI assembling process is more of a bulk process facility, where many cards are produced in a centralized facility, one after another. For example, picture a setting where a driver passes a driving test, but then receives her license in the mail from a CI facility a short time later. The CI facility may process thousands of cards in a continuous manner.

Centrally issued Identification documents can be produced from digitally stored information and generally include an opaque core material (also referred to as "substrate"), such as paper or plastic, sandwiched between two layers of clear plastic laminate, such as polyester, to protect the aforementioned items of information from wear, exposure to the elements and tampering. The materials used in such CI Identification documents can offer durability. In addition, centrally issued digital Identification documents generally offer a higher level of security than OTC Identification documents because they offer the ability to pre-print the core of the CI Identification document with security features such as "micro-printing," ultra-violet security features, security indicia and other features currently unique to centrally issued Identification documents.

In addition, a CI assembling process can be more of a bulk process facility, in which many Identification documents are produced in a centralized facility, one after another. The CI facility may, for example, process thousands of Identification documents in a continuous manner. Because the processing occurs in bulk, CI can have an increase in efficiency as compared to some OTC processes, especially those OTC processes that run intermittently. Thus, CI processes can sometimes have a lower cost per Identification document, if a large volume of Identification documents are manufactured.

In contrast to CI Identification documents, OTC Identification documents are issued immediately to a bearer who is present at a document-issuing station. An OTC assembling process provides an Identification document "on-the-spot". An illustrative example of an OTC assembling process is a Department of Motor Vehicles ("DMV") setting where a driver license is issued to person, on the spot, after a successful exam. In some instances, the very nature of the OTC assembling process results in small, sometimes compact, printing and card assemblers for printing the Identification document. It will be appreciated that an OTC card issuing process can be by its nature an intermittent process in comparison to a continuous process.

OTC Identification documents of the types mentioned above can take a number of forms, depending on cost and desired features. Some OTC Identification documents comprise highly plasticized poly(vinyl chloride) or have a composite structure with polyester laminated to 0.5-2.0 mil (about 13-51 µm) poly(vinyl chloride) film, which provides a suitable receiving layer for heat transferable dyes which form a photographic image, together with any variant or invariant data required for the identification of the bearer. These data are subsequently protected to varying degrees by clear, thin overlay patches (0.125-0.250 mil, or about 3-6 µm) applied at the printhead, holographic hot stamp foils (0.125-0.250 mil, or about 3-6 µm), or a clear polyester laminate (0.5-10 mil, or about 13-254 µm) supporting common security features. These last two types of protective foil or laminate sometimes are applied at a laminating station separate from the printhead. The choice of laminate dictates the degree of durability and security imparted to the system in protecting the image and other data.

One response the counterfeiting of Identification documents includes the integration of verification features that are difficult to copy by hand or by machine, or which are manufactured using secure and/or difficult to obtain materials. One such verification feature is the use in the Identification document of a signature of the Identification document's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an Identification document in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are difficult to manufacture without the requisite know-how, equipment, and materials.

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. A UV image can be imparted to an Identification document via methods such as thermal transfer or D2T2.

Regardless of whether the UV materials are imparted via D2T2 or mass transfer panel, both panels produce transmissive images—the mass transfer panel produces a bitonal (e.g., two tone) image and the dye sublimation panel produces a monochromatic (or shaded) image.

Color shifting and other optically variable pigments, inks, dyes, and colorants (collectively "optically variable media") have a feature of appearing to change color as the viewing angle of an observer changes (or as the angle of incident light striking the media changes). Optically variable media have been used on security documents, such as identification cards, credit cards, checks, title documents, currency, etc. The optically variable property provides several advantages when used on security documents: (a) the presence and appearance of optically variable quality provides another "check" or method to authenticate the security document; (b) optically variable media are generally more difficult for a layman to obtain and use properly, thus helping to prevent (or at least limit) forgery and to make forgeries and/or alteration easier to detect; and (c) photocopiers and scanners generally will not reproduce many types of optically variable media, helping to reduce unauthorized reproduction or counterfeiting of such documents.

Several methods exist to create optically variable media and to apply such media to security documents. One method involves dispersing in a medium (e.g., paint or ink) a plurality of relatively small particles (typically flakes) that have specific optical properties. In one example, a security document includes a plurality of thin film layers, each film having a particular color and/or optical property. In some cases, media having optically variable properties include particles comprising flat, irregularly shaped mica platelets coated with titanium dioxide and/or iron oxide. These particles, when dispersed in media, can give a generally "pearlescent" effect, with smaller particles producing a "satin" effect and larger particles producing a "glitter" effect. In many instances, optically variable media are incorporated into a material such as a laminate layer or overlaminate layer, providing optically variable indicia that overlays other information on the card. Generally, such an optically variable indicium contains "fixed" or "invariable" data (information that is the same from Identification document to Identification document).

In some cases, it is advantageous to print variable or personal UV information at the time of Identification document personalization, in one, two, or three UV colors, especially images that have a high enough quality to be used for authentication and/or identification. It is also advantageous if the same information is printed in a visible and invisible (e.g., UV) form at substantially the same time or at substantially the same printing step, where the covert image would be "identification quality."

An Identification document having a window as described herein is fabricated in a platen lamination process, in which component layers of the Identification document are fused together with heat, pressure, or both, without adhesives. Platen lamination allows the formation of flat cards with little or no thermal stress, as compared to roll lamination that creates stresses by stretching and laminating in a non-uniform manner. Platen lamination also reduces or eliminates surface interactions due to electrical charge and surface non-evenness, thereby improving card transportation in the card printer. One or more of the component layers may be preprinted (e.g., with invariable data). The resulting Identification document is referred to herein as a "card blank" or "blank card." The invariable data may be present as microprint or added in an offset printing process on one of the layers used to construct the card blank. The resulting Identification document is durable and solid, suitable for OTC or CI issue, and has an expected useful lifetime of at least 10 years.

The dynamic window, an optically functional element that delivers different visual characteristics when viewed under different lighting conditions, is formed during fabrication of the card blank. Security features may be added by the printing process, the laminating process, or both in an OTC or CI process. Thus, an Identification document with a window as described herein may be used as an OTC issue, with variable features (e.g., a photograph of the cardholder) printed (e.g., with optically variable media) on the window, other portions of the card blank, or both before lamination. As such, security features involving variable data may be added during an OTC process at an issuing location.

Figure 2:
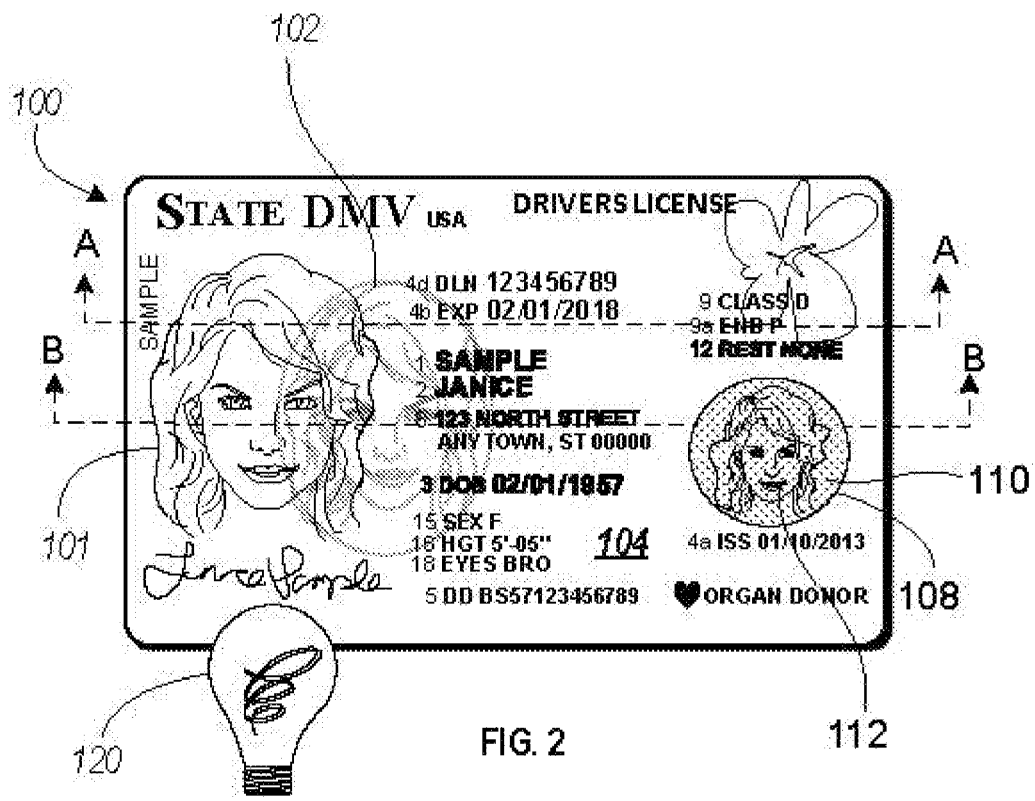
FIG. 2 depicts an exemplary Identification document with an optically variable ghost image viewed from the front in reflected light.
Figure 3:
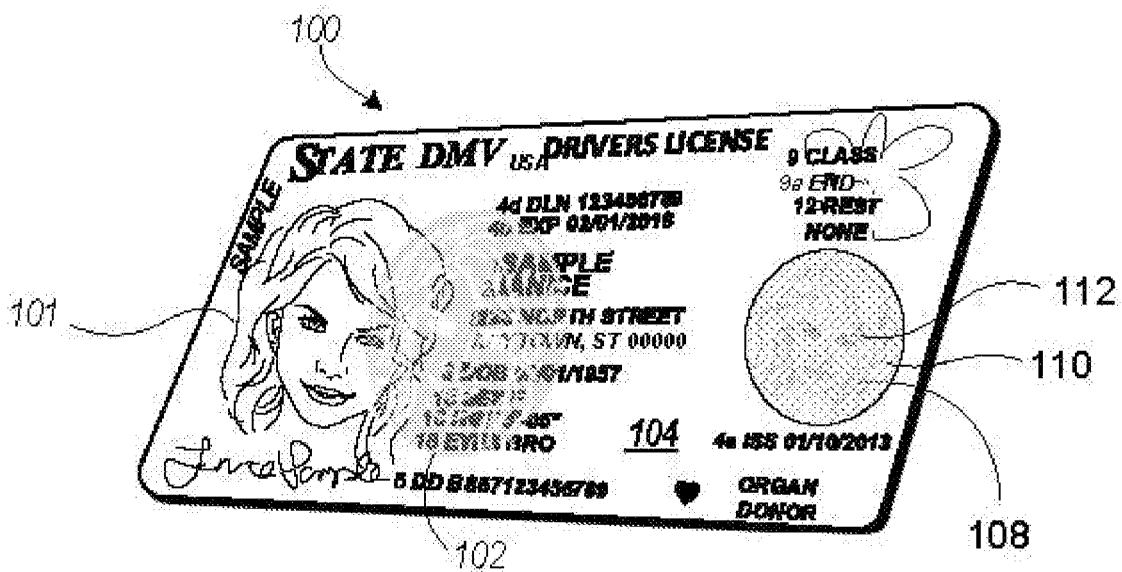
FIG. 3 depicts the Identification document of FIG. 1 viewed from the front at an angle.

FIG. 2 depicts an exemplary identification document 100 with an optically variable ghost image 102 viewed from the front 104 in reflected light. FIG. 3 depicts the identification document 100 viewed from the front 104 at a different angle from that shown in FIG. 2. As depicted, the optically variable ghost image 102 is an image or "ghost" version of portrait 101, however, the optically variable ghost image 102 can be an image of other ID information or other personal credentials. When viewed from a first angle (e.g., in directly reflected light as depicted in FIG. 2) the optically variable ghost image 102 has a first visual appearance and when viewed from a second angle (e.g., in indirectly reflected light as depicted in FIG. 3) the optically variable ghost image 102 has a second visual appearance. For example, when viewed from a first angle (e.g., in directly reflected light) the optically variable ghost image 102 is visible and appears as a highly reflective "positive" image (e.g., as shown in FIG. 2). When viewed from a second angle (e.g., in indirectly reflected light as shown in FIG. 3) the optically variable ghost image 102 appears less reflective or even translucent, and, in some examples, may give the appearance of a "negative" image. That is, optically variable ghost image 102 is visible in reflected light at greater and lesser intensity based on angle of reflection.

As depicted in FIG. 3, the optically variable ghost image 102 is less visible at the angle of reflection in FIG. 3 than at the angle of reflection in FIG. 2. Tilting the identification document 100 in reflected light causes optically variable ghost image 102 to appear more or less visible, and, in some examples, causes the optically variable ghost image 102 to appear as a "negative" image.

In some examples, the optically variable ghost image 102 can be used to overlap over a significant portion of a corresponding portrait 101, thereby linking and layering with that feature. In some examples, close alignment of the optically variable ghost image 102 to a corresponding portrait 101 is optional. In some examples, an optically variable ghost image 102 can be applied so as to partially overlay a variable indicium on the identification document 100, and the variable indicium need not be the same indicium as the optically variable ghost image 102. In some examples, an optically variable ghost image 102 can be applied to an Identification document so that it does not overlay a variable indicium on an identification document 100.

In some examples, an optically variable ghost image 102 can be applied to an area of an identification document 100 that does not contain information that would interfere with its appearance. This may permit the optically variable ghost image 102 to be printed in such a way that it is possible to obtain an appearance of a "flipping" image when the identification document 100 is viewed at different angles. For instance, the optically variable ghost image 102 may have the appearance of flipping between a "positive" image (e.g., as shown in FIG. 2) and a "negative" image (e.g., as shown in FIG. 3). More specifically, applying the optically variable ghost image 102 to an area of the identification document 100 that has no or minimal interfering features may accentuate the appearance of the optically variable ghost image 102 as a "negative" image. The area need not be a substantially blank area of the identification document 100; for example, the area could contain fixed indicia such as background colors, fine line printing, artwork, scrolls, etc.

The optically variable ghost image 102 is constructed by the use of mass transfer of materials (e.g., optically variable media) that reflect light in various ways. For example, the optically variable media change color or reflectance as the angle of incident light changes with respect to a viewing angle of an observer is changed. More specifically, optically variable media can give the optically variable ghost image 102 a highly reflective appearance at one angle (e.g., directly reflected light), but a minimally reflective or translucent appearance at another angle (e.g., indirectly reflected or scattered light).

Because the mass transfer materials used to create the optically variable ghost image 102 reflect incident light to produce an image instead of absorbing light as most dyes, the optically variable ghost image 102 is transferred to the Identification document as a "negative" image in order to produce an appearance of a "positive" image on the Identification document. The optically variable ghost image 102 can be digitally generated from a greyscale or color image (e.g., portrait 101). The optically variable ghost image 102 can be applied as a bitonal or halftone image. More specifically, the optically variable ghost image 102 is made up of areas in which optically variable media is applied to an Identification document and areas in which the optically variable media is not applied. The areas in which the optically variable media are applied appear bright in directly reflected light, thereby, giving the appearance of a "positive" image (e.g., as shown in FIG. 2). In diffuse or indirectly reflected light, the areas in which the optically variable media are applied appear dim or translucent, thereby, becoming less perceptible or, in conjunction with the background of the identification document 100, giving the appearance of a "negative" image (e.g., as shown in FIG. 3).

In another example, the optically variable ghost image 102 can be used in conjunction with an optical window 108 of the identification document 100 by using the optical features of both the ghost image and an optically functioning window 108. For example, as depicted, the window 108 is circular, but may be any shape (e.g., elliptical, rectangular, square, irregular, etc.). The window 108 has coating 110. Coating 110 is an optically variable coating 110 (e.g., a coating 110 of optically variable media). The window 108 has a first visual characteristic when viewed from front 104 of the identification document 100 in reflected light and a second visual characteristic when backlit (i.e., viewed from front 104 with light transmitted through the window 108 from the back (not shown) toward front 104). When viewed in reflected light, the prime light source 120 is on the same side of Identification document as the viewer (e.g., as shown in FIGS. 2 and 3). When backlit, the prime light source 120 is on the opposite side of the Identification document as the viewer. The first visual characteristic and the second visual characteristic are distinguishable with the unaided human eye. The appearance of window 108 may vary, for example, based on the properties of coating 110 as well as a function of the location of the prime light source 120. In some cases, window 108 may exhibit a special effect (e.g., gold metallic or silver metallic) based upon coating 110 the dynamic window's 108 coating 110. As used herein, the prime light source 120 refers to a light source that provides light most directly incident on the window 108, as opposed to more diffuse lighting.

As depicted in FIG. 3, optically variable ghost image 112 is less visible at the angle of reflection in FIG. 3 than at the angle of reflection in FIG. 2. In other words, tilting the identification document 100 in reflected light causes optically variable ghost image 112 to appear more or less visible, and also causes the coating 110 in window 108 to appear more or less muted.

In some implementations, the identification document 100 may have one or more of the following additional features generally known in the art: Guilloche security design, micro-print, microprint with deliberate error, security indicia, laser perforation, split fountain printing, IDMARC, variable micro-script, altered font, overlapping data, UV printed variable data, redundant data, one-dimensional bar code, two-dimensional bar code, tri-color optically variable device, magnetic stripes, digital watermarks, covert image, and biometric information (e.g., fingerprint, etc.). Each of these features, is optional, and the positioning or embedding of these features is variable.

Figure 4:
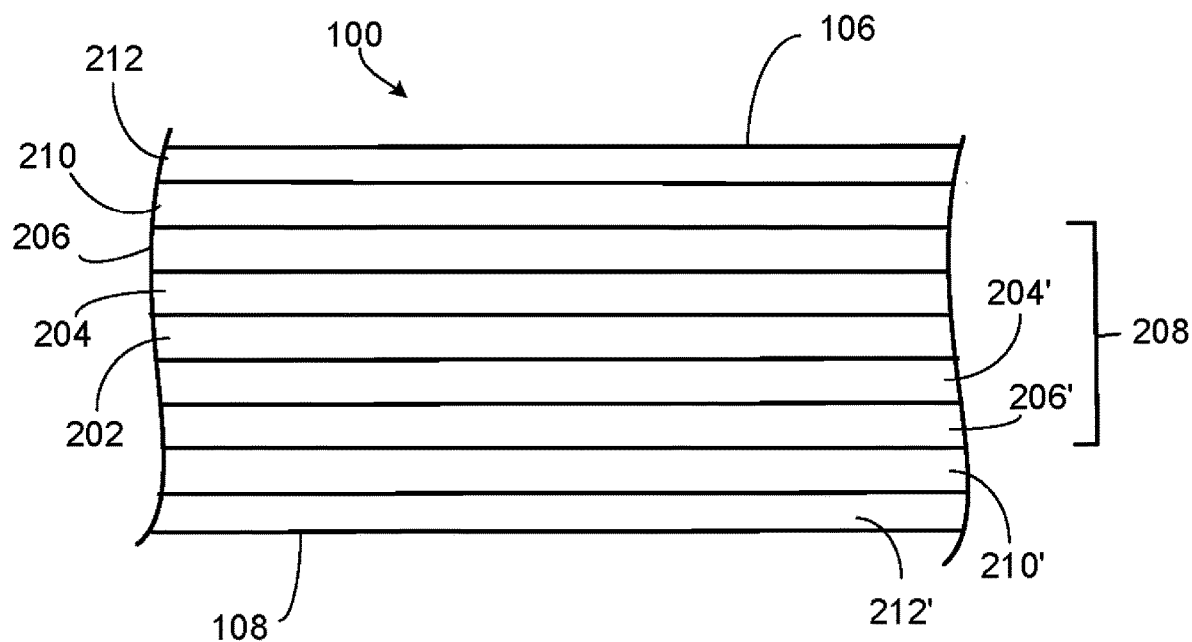
FIG. 4 is a cross-sectional view of the Identification document of FIG. 1 taken through line A-A.

FIG. 4 is a cross-sectional view of the identification document 100 taken along line A-A of FIG. 1. The identification document 100 includes core layer 202, tie layers 204, 204' on either side of the core layer, and structural layers 206, 206' on the outer side of tie layers 204, 204', respectively. Core layer 202 is opaque, houses the dynamic window, and may be preprinted on one or both sides (e.g., with invariable data). One or more of tie layers 204, 204' may also be preprinted, engraved, or both. Tie layers 204, 204' typically include multiple co-extruded layers and promote bonding between core layer 202 and structural layers 206, 206'. Structural layers 206, 206' provide durability as well as stiffness and flatness. Tamper-evident (TE) patterns may be coated onto structural layers 206, 206' via gravure. After assembly (e.g., manually or via machine), core layer 202, tie layers 204, 204', and structural layers 206, 206' are laminated in a platen lamination process to yield card blank 208, formed in the absence of adhesive compositions. The platen lamination process facilitates debossing, as well as the flatness, superior surface finish, and desired polish for card blank 208.

Receiver layers 210, 210' may be coated on the outer side of each structural layer 206, 206', respectively, and may be bonded to the structural layers via solvent dissolution, thereby becoming part of the structural layers. Tamper-evident patterns may be coated on an underside of one or more of receiver layers 210, 210'. Receiver layers 210, 210' allow good image replication (e.g., via D2T2) as well as debossing. Patterns formed by plate debossing go through the D2T2 receiver layer and into the structural layer underneath, thereby providing protection of the image, photo, or text (as applicable) from tampering or counterfeiting. Over-laminate layers 212, 212' may be coated on receiver layers 210, 210', respectively, after personalization. Overlaminate layer 212 represents front 106 of the identification document 100, and overlaminate layer 212' represents back 108 of the Identification document. Receiver layers 210, 210' and over-laminate layers 212, 212' are not considered to be part of the card blank. Thus, card blank 208 has five layers, including core layer 202, tie layers 204, 204', and structural layers 206, 206'.

Core layer 202 is typically opaque. Suitable materials for core layer 202 include white poly(vinyl chloride) (PVC), polyester, polycarbonate, polystyrene, and the like. TESLIN and other polymers that are capable of z-axis tear out and are immiscible with other polymers are typically not suitable for core layer 202. A thickness of core layer 202 is typically in a range of 5 to 10 mil (about 125 to 250 µm). Fixed indicia may be printed (or pre-printed) on core layer 202. The core layer in at least some embodiments is formed using a material adapted to be printable or markable (e.g., by laser marking) using a desired printing/marking technology. Materials that are printable can include, as an example, materials such as polyolefin, polyester, polycarbonate (PC), PVC, plastic, polyethylene terephthalate (PET), polyethylene terephthalate glycol-modified (PETG), polyethylene terephthalate film (PETF), and combinations thereof. However, materials that can split in the z-axis are typically not suitable. Many other materials are, of course, suitable, as those skilled in the art will appreciate. In an advantageous embodiment, core layer 202 is substantially opaque, which can enable printing on one side to be not viewable from the other side, but opacity is not required. In some embodiments, it may, in fact, be advantageous that core layer 202 be substantially transparent. The color of the core layer 202 may vary, but in an advantageous embodiment the core layer is colored to provide a good contrast with indicia printed (or otherwise formed) thereon. In one example, core layer 202 is light in color, thereby allowing good contrast with dark indicia. In another example, core layer 202 is dark in color, thereby allowing good contrast with light indicia.

Tie layers 204, 204' typically include multiple layers of chemically modified resins with reactive moieties (e.g., isocyanates) attached to the base resin. The reactive moieties in an outer layer of a tie layer are selected form covalent bonds with the layer in contact with the tie layer during lamination. Suitable materials for tie layers 204, 204' are compatible with other materials in the Identification document and include PETG and PC. A thickness of tie layers 204, 204' is typically in a range of 2 to 6 mil (about 50 to 150 μm). Thickness, composition, or both of tie layers 204 and 204' may be the same or different. In some cases, a laser engraved image (e.g., a hologram or KINEGRAM) is formed in one or more of tie layers 204, 204' (e.g., in tie layer 204). The laser engraving may be such that the dynamic window in core layer 202 is not affected by the laser engraving (e.g., the optically variable coating on the dynamic window is not ablated or removed by the laser engraving).

Suitable materials for structural layers 206, 206' include PC, polyethers, polyphenoxides, polyphenols, polyesters, polyurethanes, and the like. Structural layers 206, 206' may be sensitized to accept laser engraving. A thickness of structural layers 206, 206' is typically in a range of 2 mil to 10 mil (about 50 μm to about 250 μm). Thickness, composition, or both of structural layers 206, 206' may be the same or different.

Suitable materials for receiver layers 210, 210' include PC (e.g., non-sensitized), coated with, for example, modified PVC with antioxidants. The receiver coating allows good image replication and using deboss patterns promotes protection of printed features (e.g., images, text) from tampering, counterfeiting, or both. A thickness of receiver layers 210, 210' is typically in a range of 4 to 10 mil (about 100 to about 250 μm). Thickness, composition, or both of receiver layers 210, 210' may be the same or different.

If two adjacent layers are made of substantially the same material (e.g., polycarbonate), they may be laminated together into a single structure, as understood by those skilled in the art. Similarly, if a laminate and an overlaminate are both made of the same material (e.g., polycarbonate), they can be laminated into a single structure.

If the laminate is made of a material (e.g., PET) that is not itself capable of being imaged using a given printing or marking technology (e.g., D2T2), layers or coatings may be applied to the laminate to make it printable and/or markable. For example, in one embodiment, the laminate is coated with a coating that enhances absorption of laser energy. In another example, an image receiving layer that improves D2T2 printing is applied to the laminate. Variable data (e.g., signature, ghost image, fingerprint, etc.) may be printed a receiver layer, such as by D2T2, mass transfer printing, and/or laser engraving. In one implementation, optically variable indicia of variable data are formed on the laminate by printing the laminate with a conventional D2T2 YMC type of ribbon modified by the addition of a panel containing a thermally transferable thermally transferable optically variable pigment, such as ink or dye.

A window in an Identification document described herein, such as dynamic window 108 in the identification document 100, may be formed by defining an opening in the core layer (e.g., dye cutting the core layer) and positioning a plastic layer having the same dimensions as the opening and the same thickness as the core layer in the opening, such that the plastic layer is inlaid in the core layer. Suitable materials for the plastic layer include PC, PVC, PETG, and the like. The plastic layer is typically clear plastic having one or more optically functional coatings or devices (e.g., an optically variable coating, a metallic digitally mastered hologram, or both) on one or both sides. The optically functional coatings or devices may be applied to the plastic layer (e.g., before the plastic layer is positioned in the core layer) by methods known in the art, including sputtering, vacuum depositing, solution coating, and the like. Before or after application of the optically functional coatings or devices, the plastic layer is sized to fit in the opening in the core layer. The coated plastic layer is positioned in the opening in the core layer (e.g., as an insert) to yield the dynamic window.

Figure 5:
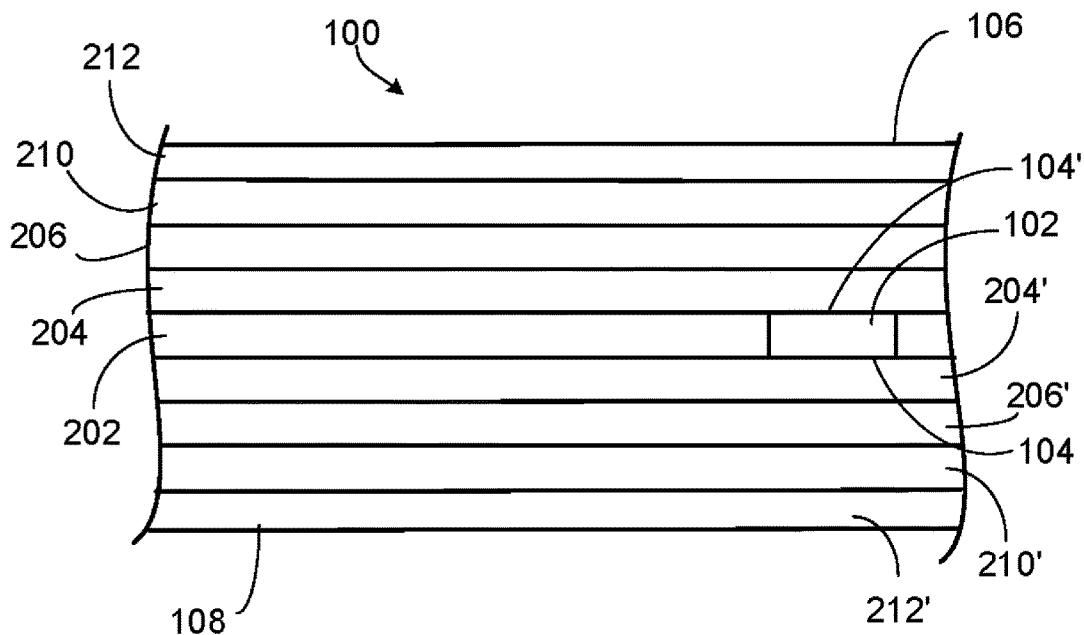
FIG. 5 is a cross-sectional view of the Identification document of FIG. 1 taken through line B-B.

FIG. 5 depicts a cross-sectional view of the identification document 100 along line B-B of FIG. 1. In one example, card blank 208 is formed by forming an opening in core layer 202 and positioning dynamic window 108 in the opening. In one example, dynamic window 108 formed from clear 6 mil (about 150 μm) plastic film (e.g., PC, PVC, PETG, or the like) with coating 110' on the side of dynamic window 108 facing front 104 of the identification document 100, coating 110 on the side of dynamic window 108 facing the back of the identification document 100, or both. Coatings 110 and 110' may be the same or different. In one example, coating 110 is gold and coating 110' is blue. As used herein, "coating 110, 110'" refers to coating 110, coating 110', or both. In some cases, coating 110, 110' may include a metallic digitally mastered hologram.

Dynamic window 108 is typically heat-stable, such that optical properties are maintained during lamination. In some cases, dynamic window 108 is laser sensitive, such that laser engraving may be used to engrave an image, text, or a combination thereof on the film. Dynamic window 108 may be laser sensitive to the exclusion of other components of identification document 100. In certain cases, a metallic KINEGRAM may be printed on dynamic window 108 and a laser (e.g., a YAG laser or $CO_2$ laser) may be used to laser write variable data into the dynamic window before fabrication of the card blank. In still other cases, an optically variable device (OVD) (e.g., a metallic KINEGRAM or hologram) may be printed on either side of dynamic window 108 or on another layer of the Identification document and superimposed on either side of the dynamic window.

Fabricating card blank 208 corresponding to the identification document 100 as described herein is achieved by assembling the layers of the card blank by hand or machine and plate laminating by pressure, heat, or both by methods and equipment generally known in the art (e.g., buckle laminators). Coating 110, 110' may be applied to dynamic window 108 before or after placement of the dynamic window in core layer 202. The dynamic window is typically held in the core layer by friction or ultrasonically welded in place. Thickness of an exemplary Identification document is typically 30±3 mil (about 760±76 μm). These Identification documents are generally fabricated to meet applicable ISO and AAMVA standards.

Coating 110, 110' is formed by application of a dispersion to the substrate used to form dynamic window 108. The dispersion typically includes an inorganic pigment, a solvent, and a binder, and is formulated to achieve a viscosity suitable for coating in a coating process (e.g., at least 50 wt % solvent, at least 10 wt % binder, and at least 10 wt % pigment; or 50-70 wt % solvent, 10-25 wt % binder, and 10-30 wt % pigment). Examples of suitable coating processes include gravure coating, sputtering, vacuum depositing, solution coating, or the like. One or more layers (e.g., one to four layers) of the dispersion may be applied to the substrate to yield coating 110, 110', with coating 110' on a front side of dynamic window 108, coating 110 on a back side of dynamic window 108, or both. In some cases, coating 110' completely covers the front side of dynamic window 108, coating 110 completely covers the back side of dynamic window 108, or both. In other cases, portions of dynamic window 108 are free of coating 110, 110', with the excluded regions in the form of text, images, or the like.

The inorganic pigment generally includes particles such as rod-shaped particles or structured thin metallic platelets (e.g., flakes) that act as mirrors. The optical intensity of the platelets changes according to the angle from which they are viewed. Maximum light intensity is achieved near the angle at which the incident light is totally reflected. Minimum light intensity is experienced at an angle far away from total reflection. After the dispersion is applied to the substrate, the solvent evaporates and the particles align on the substrate and are immobilized in the binder, yielding aligned particles in a film on the substrate. When the primary light source is transmitted through the dynamic window toward the viewer, coating 110, 110' has a transparent appearance.

Examples of suitable solvents include ketones, aliphatic or cyclic ethers, and acetates, such as ethyl acetate, propyl acetate (e.g., n-propyl acetate), butyl acetate (e.g., n-butyl acetate), and the like. Examples of suitable binders include PVCs, vinyl acetates, and copolyester resins (e.g., VITEL copolyester resins available from Bostik, such as VITEL 2700B LMW and VITEL 5833B, and the like) that are soluble in the solvent. Examples of suitable inorganic pigments include IRIODIN/AFFLAIR-103 Rutile Sterling Silver (available from EMD Chemicals) and FLAMENCO Gold-220C (available from BASF). IRIODIN/AFFLAIR-103 Rutile Sterling Silver is a pearlescent silver pigment comprised of mica-based flakes coated with a thin layer of metal oxides (e.g., $TiO_2$ and $SnO_2$). FLAMENCO Gold-220C is a pearlescent gold pigment that includes mica and $TiO_2$. The interplay of colors produced by these pigments is due to the layered structure of the metal oxides, which is also imparts a rich, deep glossy effect. Particle sizes ranging from about 10 to about 60 microns are suitable for digital thermal printing ribbon application described herein (e.g., 300 dpi). In one example, coating 104, 104' is formed from a dispersion containing 12.4 wt % n-butyl acetate, 49.6 wt % n-propyl acetate, 16.5 wt % VITEL 2700B LMW, 1.5 wt % VITEL 5833B, and 20 wt % Flamenco Gold-220C.

During personalization of the card blank, ghost image 112 may be printed on a transparent layer (e.g., receiver layer 210) superimposed on dynamic window 108. Referring to the identification document 100, when dynamic window 108 is viewed from back 108 of identification document 100 in reflected light, the light travels through transparent layers of the Identification document and reflects from coating 104 imparting an opaque appearance to the dynamic window, and image 110 is not visible. When dynamic window 108 is viewed from front 104 of identification document 100 in reflected light, light travels through transparent layers of the Identification document to ghost image 112 and coating 110 and reflects from the coating, such that the image is seen to have a background that corresponds to the coating. When dynamic window is viewed from front 104 or back of the identification document 100 in transmitted light (e.g. backlit), light is not reflected from coating 110 and dynamic window 108 and ghost image 112 have a transparent appearance. When an image is printed or superimposed on a back of dynamic window 108 (e.g., on receiver layer 210'), corresponding principles apply, based on the presence of coating 110, 110', or both.

In one implementation, identical images are printed on each receiver layer and on a front or back of the dynamic window, with the identical images superimposed such that the identical images appear to be a single image or three separate images based on the angle at which the dynamic window is viewed from the front of the identification document in light transmitted through the dynamic window from a back of the identification document toward the front of the identification document.

In one example, a card blank corresponding to an identification document described herein includes layers 202, 204, 204', and 206, 206', as defined below.

Structural layer 206: 7 mil polycarbonate (PC) (non-sensitized);

Tie layer 204: 5 mil five-layer co-extruded tie layer (e.g., PETG/PETG+PC/PC/PETG+PC/PETG);

Core layer 202: 6 mil white polyvinyl chloride (PVC) with window;

Tie layer 204': 5 mil five-layer coextruded tie layer (e.g., PETG/PETG+PC/PC/PETG+PC/PETG); and Structural layer 206': 7 mil PC (non-sensitized).

Receiver layers 210, 210' (e.g., 2-6 mil D2T2 receiver layers) may be coated on structural layers 206, 206', respectively, prior to personalization. The card blank may be personalized in a CI or OTC setting and the printed card may be overlaminated. In one example, overlamination layers 212, 212' may be printed over receiver layers 210, 210', respectively, with a desktop (e.g., D2T2) printer or large in-line printer or laminator (e.g., Datacard MX-6100).

It should be appreciated that while many of the figures shown herein illustrate a particular example of an Identification document (e.g., a driver license) the scope of this disclosure is not so limited. Rather, methods and techniques described herein, apply generally to all Identification documents defined above. Moreover, techniques described herein are applicable to non-Identification documents, such as embedding 3D images in features of Identification documents. Further, instead of Identification documents, the techniques described herein can be employed with product tags, product packaging, business cards, bags, charts, maps, labels, etc. The term Identification document is broadly defined herein to include these tags, labels, packaging, cards, etc. In addition, while some of the examples above are disclosed with specific core components, it is noted that laminates can be sensitized for use with other core components. For example, it is contemplated that aspects described herein may have applicability for articles and devices such as compact disks, consumer products, knobs, keyboards, electronic components, decorative or ornamental articles, promotional items, currency, bank notes, checks, or any other suitable items or articles that may record information, images, and/or other data, which may be associated with a function and/or an object or other entity to be identified.

In some implementations, optically variable media used with an identification document includes thermal transfer coating that includes a binder and an inorganic pigment. In such implementations, a weight ratio of the binder to the inorganic pigment is between 2.5:1 and 0.4:1 binder to pigment.

Further modifications and alternative implementations of various aspects will be apparent to those skilled in the art in view of this description. For example, while some of the detailed implementations described herein use UV, IR, thermachromic, and optically variable inks and/or dyes by way of example, the present disclosure is not so limited. Accordingly, this description is to be construed as illustrative only. It is to be understood that the forms shown and described herein are to be taken as examples of implementations. Elements and materials may be substituted for those illustrated and described herein, parts and processes may be reversed, and certain features may be utilized independently, all as would be apparent to one skilled in the art after having the benefit of this description.

Figure 6:
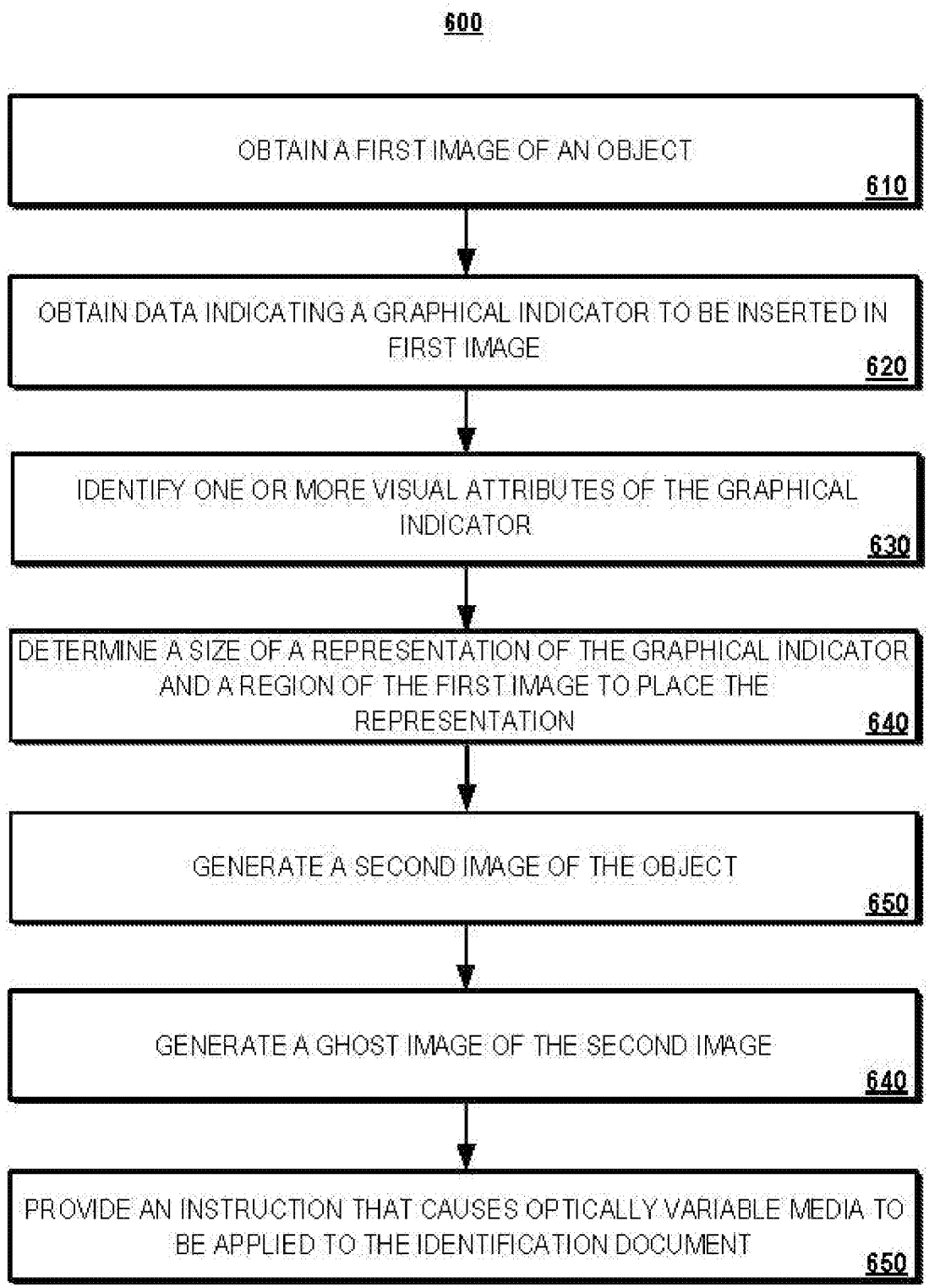
FIG. 6 depicts a flowchart of a process for generating and applying a ghost image to an identification document.

FIG. 6 depicts a flowchart of a process 600 for applying a ghost image to an identification document. Briefly, the process 600 can include the operations of obtaining a first image of an object (610), obtaining data indicating a graphical identifier to be inserted in the first image (620), identifying one or more visual attributes of the graphical identifier (630), determining a size of a representation of the graphical identifier and a region of the first image to place the representation (640), generating a second image of the object (650), generating a ghost image of the second image (660), and providing an instruction that causes optically variable media to be applied to the identification document (670).

In general, the process 600 can be performed by one or more computing systems that are used to generate and manufacture physical identification documents such as driver licenses. For example, the computing systems can use techniques to embed graphical identifiers into a ghost image within a layer of laminate of an identification document. As shown in FIG. 1, the ghost image can include optically variable media that has a first appearance when viewed from a front of the identification document in reflected light at a first angle and a second, different appearance when viewed from the front of the identification document in reflected light in a second, different angle. The descriptions below are in reference to a single computing system for simplicity, although the operations of the process 600 can be performed by multiple computing systems with suitable hardware components for generating identification documents.

In more detail, the process 600 can include the operation of obtaining a first image of an object (610). For example, as shown in FIG. 1, a computing system can obtain the portrait 101 of an individual that is associated with an identification document. In this example, the portrait 101 is used to generate the identification document for the individual, such as the Identification documents depicted in FIGS. 2 and 3. In other examples, the obtained image can include other types of input images as discussed above.

In some implementations, the portrait 101 is a color image, and generating the process image 103 includes generating the second image by converting portrait 101 to a greyscale image. The portion of the portrait 101 that does not correspond to the individual can be removed and converted a greyscale image. For example, in such implementations, the computing system may process a color photograph of an individual to generate a greyscale image with the background removed when generating a ghost image, as discussed below.

The process 600 can include the operation of obtaining data indicating a graphical identifier to be inserted in the first image (620). For example, as shown in FIG. 1, the computing system can obtain data indicating graphical identifiers 103a and 103b that are to be inserted into the portrait 101 to generate the processed image 103. The computing device can also obtain embedded data (i.e., information that is embedded in the graphical identifiers). The embedded data is assigned to the graphical identifiers 103a and 103b and stored within the identifier repository 150. For example, embedded data for the graphical identifier 103a corresponds to a verified SSN for the individual, and embedded data for the graphical identifier 103b corresponds to a verified address of the individual. As discussed above, the embedded data can be used to verify the authenticity of an identification document for the individual once created.

The process 600 can include the operation of identifying one or more visual attributes of the graphical identifier (630). For example, the computing system can identify attributes that are used to determine the presentation of the graphical identifier on the identification document. In some instances, where the graphical identifier includes text, the visual attributes can include font type, font modifiers, text size, etc. In other instances, where the graphical identifier is a graphical logo, the visual attributes can be the shape of the graphical identifier.

In some implementations, the visual attributes can include attributes of a graphical identifier that are identified regardless of the type of graphical identifier used. For example, as shown in FIG. 1, the computing device can identify how dark a representation of the graphical identifiers 103a and 103b will be when inserted into the image 103. In this example, the darkness can be represented by an average pixel value of pixels included in, for instance, the graphical identifier 103a. As discussed below, the visual attributes can be used to determine a specified region in the portrait 101 to place a representation of the graphical identifier 103a and the size of the representation in the specified region.

The process 600 can include the operation of determining a size of a representation of the graphical identifier and a region of the first image to place the representation (640). For example, as shown in FIG. 1, the computing system can determine the size of the representation of the graphical identifier 103a and the region of the portrait 101 to insert the representation based on the one or more visual attributes of the graphical identifier 103a. As discussed above, the visual attributes can include an average pixel value of the pixels included in the graphical identifier 103a, which is used to determine the size of the representation and the region of the portrait 101. In the example depicted in FIG. 1, the graphical identifier 103a is placed in a hair region of the portrait 101 because the difference between the average pixel value of the pixels within the graphical identifier 103a and the average pixel value of the pixels within the hair region of the portrait 101 satisfies a predetermined threshold. In this example, the computing system uses the predetermined threshold to determine that the graphical identifier 103a is most visually similar to the hair region compared to other regions of the portrait 101 (e.g., a face region, a neck region, etc.). In this example, average pixel values are used to represent darkness of a graphical identifier as well as a region of the portrait 101 to minimize the visual effect of inserting the graphical identifier 103a on the appearance of the processed image 103.

The computing system can also use the visual attributes to determine the appropriate size for the representation of the graphical attribute 103a when inserting it into the portrait 101. For example, as discussed above with respect to FIG. 1, the size of the graphical identifier 130a is larger than the size of the graphical identifier 130b based on the difference in the darkness of the corresponding regions of the portrait 101.

For example, a first region surrounding the graphical attribute 103a is darker than a second region surrounding the graphical attribute 103b. In this example, the computing system determines that a graphical identifier placed in the first region is more likely to be visible than a graphical identifier placed in the second region, and as a result, determines that the size of the graphical identifier 103a should be larger than the size of the graphical identifier 103b when inserting these identifiers into the portrait 101. While this example illustrates how visual attributes of different regions of the portrait 101 can be used to determine the size of graphical identifiers 103a and 103b, in other implementations, the size of the graphical identifiers 103a and 103b can be determined based on the visual attributes of the graphical identifiers themselves, or a combination of both the graphical identifiers and the surrounding regions of the portrait 101 where the graphical identifiers are to be placed. For example, the computing system can determine a size of a graphical identifier based on whether the graphical identifier represents text or a graphical image, continuity patterns associated with curvatures of line segments included within the graphical identifier, among other types of features, pixel value distributions in an area defined by the graphical identifier, among others.

The process 600 can include the operation of generating a second image of the object (650). For example, as shown in FIG. 1, the computing system can process the portrait 101 to generate the processed image 103. In processing the portrait 101, the computing system can determine sizes of representations of the graphical identifiers 103*a* and 103*b* to be inserted into the portrait 101 and specified regions of the portrait 10 to insert the representations, as discussed above. The representations of the graphical identifiers 103*a* and 103*b* can be combined with the portrait 101 to generate the processed image 103, as shown in FIG. 1. The computing system may use various types of image processing techniques to generate the processed image 103. For example, the computing system can simply overlay the graphical identifiers 103*a* and 103*b* on top of the portrait 101, as shown in FIG. 1, or alternatively, use more sophisticated image combination techniques to reduce the visibility and/or detectability of the graphical identifiers 103*a* and 103*b* within the process image 103.

In some implementations, the computing system places graphical identifiers in specific regions of an input image based on segmenting the input image to determine portions of the image that include an object of interest and portions of the image that do not include the object of interest. In such implementations, the graphical identifiers are only placed in portions of the image that do include the object of interest so that, when generating a ghost image where the background is removed, the graphical identifier is also not removed. For example, the optically variable ghost image 102 in the identification document 100 depicted in FIG. 2 is a negative image of a portrait that only includes portions of the portrait the individual with other portions removed. In this example, a graphical identifier would be placed in the portion of the portrait that includes the individual so that removal of the other portions of the portrait to generate a halftone image does not inadvertently remove the inserted graphical identifier.

The computing system can identify the portions of the portrait 101 corresponding to the object using image segmentation techniques. For example, the computing system may use object recognition techniques to identify boundaries of an object of interest, such as the outlines of an individual's headshot. In this example, the computing device can segment the portrait 101 into, for instance, a foreground that is likely to include a picture of the individual, and a background that is not likely to include a picture of the individual. In some instances, the computing system may compute confidence scores for segmented regions of the image to each represent a likelihood that a particular segmented region includes and/or corresponds to an object of interest. In such instances, the computing system can use the confidence scores to classify the foreground of the portrait 101 as representing a region that is likely to include the individual, and classify the background of the portrait 101 as representing a region that is unlikely to include the individual.

The process 600 can include the operation of generating a second image of the object (650). For example, as depicted in FIG. 1, the computing device can generate the processed image 103 based on combining the representations of the graphical identifiers 103*a*, 103*b* and the portrait 101. The combination can be performed according to the respective sizes of the representations and the regions of the portrait to insert the corresponding representations as discussed above in step 640.

In some implementations, the computing system uses different image processing techniques to preprocess the portrait 101 to generate the processed image 103 based on various factors, such as whether the tonality of image reproduction is bitonal. Additionally, or alternatively, the processing can be based on attributes that affect the viewing methods used with the processed image, such as reflectance, transmissive characteristics and tactility.

The process 600 can include the operation of generating a ghost image of the second image (660). For example, as shown in FIG. 1, the computing system can generate the optically variable ghost image 105 of the processed image 103. In this example, the computing system generates the optically variable ghost image 105 based on converting the image 103 to a negative image and removing portions of the image 103 that do not correspond to the individual in the portrait 101. In the example depicted in FIG. 2, the portrait 101 can represent an original image and the optically variable ghost image 102 can represent the image that is generated by the one or more processors using the image processing techniques discussed above. In this example, the optically variable ghost image 102 is a negative image of the portrait 101 and only includes the portion of the portrait 101 that corresponds to the photographed individual.

The computing system can generate a ghost image that, when fabricating an identification document, is made up of areas in which optically variable media is applied to the identification document. In the example depicted shown in FIG. 2, the optically variable ghost image 102 can be applied as halftone image in that optically variable media is applied to an identification document in a manner that traces lines defining the facial attributes of the individual in the portrait 101. In this example, the areas are not traced by gray areas represent portions of the portrait 101 that are removed when generating the halftone image (e.g., regions of the image where optically variable media is not applied to the Identification document). In other examples, such as the example shown in FIG. 3, the halftone image can be generated such that lines tracing facial attributes of the individual in the portrait 101 represent areas where optically variable material is not applied.

The process 600 can include the operation of providing an instruction that causes optically variable media to be applied to the identification document (660). For example, as discussed above, the computing system can transmit an instruction to an identification printing device and/or an identification fabrication device that applies the optically variable media to a location of the identification document where the ghost image is to be placed within the identification document. In the examples depicted in FIGS. 2 and 3, the computing device provides an instruction such that the optically variable media is applied to the identification document 100 to produce the optically variable ghost image 102. In the example depicted in FIG. 2, the optically variable media is applied such that, when the Identification document is generated, the optically variable ghost image 102 is a positive image of the portrait 101. Alternatively, in the example depicted in FIG. 3, the optically variable media is applied such that, when the Identification document is generated, the optically variable ghost image 102 is a negative image of the portrait 101. As discussed above with respect to FIGS. 4 and 5, the optically variable media can be applied within a layer of laminate of the Identification document.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:
1. An identification document comprising:
a multilayer laminate comprising a first layer; and
a ghost image representing an image of an individual identified by the identification document, the ghost image comprising:
(i) optically variable media applied to the first layer and having a first appearance when viewed from a front of the identification document in reflected light at a first angle and a second, different appearance when viewed from the front of the identification document in reflected light at a second, different angle, wherein the ghost image includes a) first areas where the optically variable media is applied to the identification document and b) second areas where the optically variable media is not applied, and wherein the first areas are lighter when viewed in direct reflected light and give an appearance of a positive image of the image of the individual, wherein the first areas are darker when viewed in diffuse or indirect reflected light and give an appearance of a negative image of the image of the individual, wherein the second areas correspond to lines tracing facial attributes of the individual,
(ii) graphical identifiers overlaying the optically variable media, wherein the graphical identifiers are located within the ghost image spaced from a boundary edge of the ghost image, the graphical identifiers including:
a first graphical identifier overlapping a first location within the ghost image that corresponds to a first region of the image of the individual, wherein the first graphical identifier has a first size,
a second graphical identified overlapping a second location within the ghost image that corresponds to a second region of the image of the individual, wherein the second graphical identifier has a second size,
wherein the first region is darker than the second region of the image, and
wherein the first size is larger than the second size.

2. The identification document of claim 1, wherein the ghost image is generated by:
  removing a background of a color photographic image,
  converting the color photographic image with the background removed to a negative greyscale image, and
  generating the ghost image from the negative greyscale image.

3. The identification document of claim 1, wherein the first graphical identifier comprises a graphical overlay associated with an issuing authority of the identification document.

4. The identification document of claim 1, wherein the first graphical identifier comprises an alphanumeric character.

5. The identification document of claim 1, wherein the first graphical identifier is associated with an issuing authority of the identification document.

6. The identification document of claim 1, wherein the ghost image is a halftone image of a photographic image of the individual associated with the identification document.

7. The identification document of claim 1, wherein the ghost image is displayed on a surface of the multilayer laminate in response to ultraviolet light being applied to the identification document.

8. The identification document of claim 1, wherein the ghost image is responsive displayed on a surface of the multilayer laminate in response to infrared light being applied to the identification document.

9. The identification document of claim 1, wherein:
  the identification document further comprises a temperature-sensitive region that changes in appearance based on a temperature of the identification document; and
  a region of the identification document corresponding to the ghost image overlaps with the temperature-sensitive region such that a change in appearance of the temperature-sensitive region produces a change in appearance of the ghost image.

10. The identification document of claim 1, wherein the first graphical identifier and the second graphical identifier have different shapes corresponding to respective types of each of the identifiers.

11. The identification document of claim 1, wherein a difference in darkness of the first graphical identifier and the first region of the image is within a predetermined threshold value.

* * * * *